UNITED STATES PATENT OFFICE 2,236,429

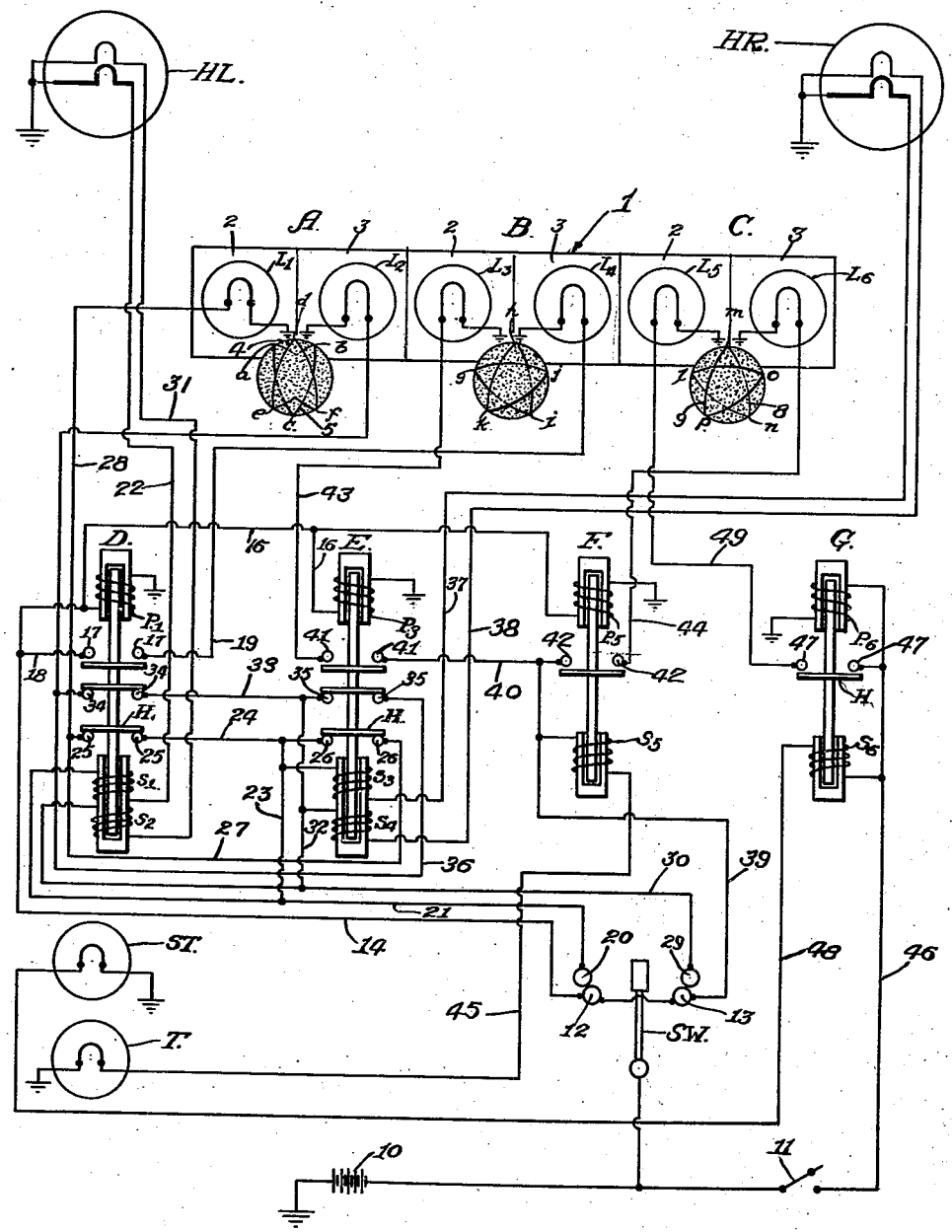

ELECTRICAL INDICATOR CIRCUITS

George W. Hipsley, San Salvador, El Salvador, assignor of ten one-hundredths to Juan G. Mathé, San Salvador, El Salvador Original application February 5, 1935, Serial No. 5,141. Divided and this application February 23, 1938, Serial No. 192,120

2 Claims. (Cl. 177—311)

This invention relates to signal or indicator devices whereby certain conditions of electrical circuits at any particular time are clearly indicated, or whereby a distinctive signaling indication may be given when desired and is a division of application Serial No. 5,141, filed February 5, 1935.

The invention is directed particularly to automobile lighting systems but it is not limited thereto, being applicable in any analogous instance where it is desired to give a distinctive signaling indication for the purpose in view. The need for a device of this character in connection with automobile lighting circuits is well known. With the ever increasing number of automobiles using the roads and highways, the danger due to defective lighting apparatus is likewise increasing. It is quite common to see an automobile approaching with only one headlight lighted, and the operator or driver of a vehicle confronted by another vehicle thus defectively lighted is in extreme danger, particularly under adverse weather conditions or on an extremely dark night when he is unable to discern whether the approaching vehicle is an automobile or a motorcycle or, if it is an automobile, which of the headlights is lighted, and how much passage room he must give to the vehicle. This situation has been the cause of numerous accidents, many of them fatal. Likewise, an unlighted rear or tail light on a vehicle presents extreme danger of collision from the rear.

While some of the motor vehicle laws have strict requirements as to the lighting of vehicles, in most instances, the operator or driver of a vehicle which is defectively lighted does not know that this condition exists, particularly under certain weather conditions, such as heavy mist or fog when it is impossible to tell whether one or both of the headlights are lighted. Moreover, in any case, the operator usually has no way of knowing whether the rear or tail light of his vehicle is functioning properly. The same applies to the stop light which is now being used conventionally, and the danger of collision from the rear, due to a defective stop light, is comparable to the danger incident to a defective tail light.

The object of the present invention is to provide a practical and efficient device which is adapted to apprise the operator or driver of a vehicle at all times as to the exact condition or certain connections of his lighting system, and which will fulfill the urgent need for such a device, particularly in the field of automobile lighting.

Various devices have heretofore been proposed for the general object in view, which devices have attempted in a general way to accomplish the desired result but none of those devices have been entirely successful. Such devices have employed solenoids and electromagnets for controlling electrical circuits of the indicating device, arranged so that every time the lights of the vehicle are switched on or off or from bright to dim or vice versa, the contacts of the signalling device are either opened or closed, and the solenoids or electromagnets actuate their armatures against the force of springs or of gravity. Such devices usually include undue resistance in the lighting circuits. When it is considered that in the average case, the vehicle lights may be switched on or off several thousand times during a period of a year, and when it is further considered that the mechanical parts of such a device are necessarily of a delicate nature, that with this arrangement, it is quite evident the parts are subject to extreme wear and are very likely to get out of adjustment in these prior devices. Another difficulty with the devices of the prior art is their inability to indicate the condition or connection of all the principal lights of the lighting system.

The present invention, the difficulties of the prior art devices are obviated, and various novel features are incorporated which greatly enhance the device both structurally and functionally. The invention may be clearly understood from the illustration of a preferred form of the device contained in the accompanying drawing which is a schematic diagram of the invention.

Referring particularly to the drawing, the device comprises an indicator assembly 1 which may be mounted in any convenient position that is clearly visible to the operator of the vehicle. For example, the indicator may be mounted on the instrument panel, or at some other convenient place in the driver's compartment of the vehicle in such position that the operator of the vehicle will be cognizant at all times of the immediate indication of one or more lamp failures, or the indicator may be mounted above the windshield or in any other convenient location where it will be clearly visible. The indicator, as shown in this application, comprises three similar sections A, B and C, but it is to be understood that this is a preferred embodiment and that the device is not limited to this arrangement, and that other arrangements are possible within the scope of the invention. As will be more clearly explained hereinafter, the purpose of section A is to indicate whether the headlights are bright or dim, or whether their beams are elevated or lowered. The purpose of section B is to indicate failure of one or both of the headlights, such indication being given whether the lights are bright or dim and the purpose of section C is to indicate failure of either the tail or stop light or lights.

Each of the sections A, B and C comprises a pair of compartments or chambers 2 and 3 within which are positioned indicating lamps $L_1$ to $L_6$, inclusive, and provided with distinctively shaped apertures which may be covered by transparent members formed of colored glass or other suitable material.

The purpose of the distinctively shaped apertures or openings is to form on the view plates indications having specific meanings. In section A, the opening which passes light from the lamp $L_1$ is designed so as to form on the view plate the arrow-head image 4 which points upward and which is defined by the points $d, e, f$. On the other hand, the opening or aperture through which passes the light from lamp $L_2$, forms on the view plate the downwardly pointing arrow-head image 5, which is defined by the points $a, b, c$. As will be more clearly understood hereinafter, only one of these images is formed at one time, the downwardly pointing image 5 indicating the downward position of the headlight beams or the dim operation of the headlights, while the upwardly pointing image 4 indicates the elevated position of the headlight beams or the bright operation of the headlights. It is therefore, possible to have a comomn field for these two images, as illustrated.

The opening or aperture of section B is of such shape or configuration that it causes the projection of an image 6 by the light from lamp $L_3$. This image, which is defined by the points $g, h, i$, points downwardly and toward the right. When this image is formed, it indicates that the right hand headlight has ceased to function, as will be more fully understood hereinafter. The opening of section B for lamp $L_4$ is of such shape that it causes the formation of an image which is defined by points $h, j, k$ and also points downwardly but toward the left, indicating failure of the left hand headlight. The openings of section C are similar, respectively, to the corresponding openings of section B and cause the formation of similar images. In this case, however, the image pointing toward the left, formed by light from lamp $L_6$, indicates failure of the tail light or lights, while the image pointing toward the right, formed by light from lamp $L_5$, indicates failure of the stop light or lights. These images are shown in the drawing and the image pointing toward the right is designated 8 and defined by the points $l, m, n$, while the image pointing toward the left is designated 9 and defined by points $m, o, p$.

The indicator 1 embodies numerous other features and details of construction and arrangement as respects the particular manner in which clearly defined images are obtained on the several view plates and in various colors and these are described at length in my copending application Serial No. 5,141, aforesaid. The invention further comprises two types of specially designed electromagnetic contactors, the mechanical structures of which are also described in said copending application. These contactors are shown at D, E, F and G in the drawing accompanying the present application and their electrical operation and control functions will be described hereinafter with reference thereto.

In the drawing, the invention is illustrated in its application to a complete automobile lighting system. The two headlights are shown at HL and HR. Each of these headlights is of conventional form with bright and dim filaments arranged to give different elevations of the light beams, the bright filament being indicated by a relatively heavy line illustration. The tail light of the vehicle is shown at T and the stop light is shown at ST. The light switch is shown at SW. This switch is a two-position switch arranged for bright and dim operation of the headlights. When the switch is thrown to the left, the headlights are operated brightly with the light beams in upper position, while in the right hand position of the switch SW, the headlights are operated dimly with the light beams in lower position. The usual battery, which supplies the lighting current, is shown at 10, while the usual stop light switch is shown at 11. It will be understood that this switch is operated when the vehicle brake is applied as is customary.

The ungrounded terminal of battery 10 is connected to the movable member of switch SW. The stationary contacts 12 and 13 of the switch are connected together as illustrated. Contact 12 is connected by a conductor 14 to one extremity of the shunt winding $P_1$ and to the corresponding extremity of the windings $P_3$ and $P_5$ via branch conductors 15 and 16. The other extremity of each of these windings is grounded as illustrated. The contact 12 is also connected to one of the upper contacts 17 of contactor D via branch conductor 18. The other of the contacts 17 is connected via conductor 19 to lamp $L_4$.

The contact 20 of switch SW is connected via conductor 21 to one extremity of winding $S_1$ of the contactor D, the other extremity of this winding being connected via conductor 22 to the bright filament of the headlight HL. The contact 20 is also connected via the branch conductor 23 to one extremity of winding $S_3$ and also via branch conductor 24 to one of the contacts 25 of contactor D and to one of the contacts 26 of contactor E. The others of these pairs of contacts are connected together via conductor 27. The lamp $L_1$ is connected to these contacts by conductor 28.

Contact 29 of switch SW is connected via conductor 30 to one extremity of winding $S_2$ of contactor D, the other extremity of this winding being connected via conductor 31 to the dim filament of the headlight HL. The contact 29 is also connected via branch conductor 32 to one extremity of winding $S_4$ of contactor E and also via branch conductor 33 to one of the stationary contacts 34 of contactor D and to one of the stationary contacts 35 of contactor E. The others of these pairs of contacts are connected together via conductor 36. The lamp $L_2$ is connected to these contacts by conductor 37. The other extremities of windings $S_3$ and $S_4$ are connected respectively via conductors 37 and 38 to the bright and dim filaments of headlight HR.

Contact 13 of switch SW is connected via conductor 39 to one extremity of winding $S_5$ of contactor F and also via branch conductor 40 to one of the contacts 41 of contactor E and to one of the contacts 42 of contactor F. Lamp $L_3$ is connected to the other contact 42 by conductor 44. The other extremity of winding $S_5$ is connected via conductor 45 to the tail light T.

The battery 10 is connected via stop switch 11 and conductor 46 to one extremity of each of the windings P6 and S6 of contactor G and also to one of the contacts 47 of that contactor. The other extremity of winding P6 is grounded, as illustrated, while the other extremity of winding S6 is connected to the stop light ST by conductor 48. The lamp L6 is connected to the other contact 47 by conductor 49.

The operation of the device is as follows: Assume that switch SW is thrown to the left hand position to give bright operation of the headlights, the ungrounded side of the battery will then be applied to both the switch contacts 12 and 20. A circuit will be completed through contact 12, conductor 14 through winding $P_1$ of contactor D and also through the corresponding shunt windings $P_3$ and $P_5$ of contactor E and F via conductors 15 and 16. The shunt windings of these three contactors will, therefore, be energized. At the same time, a circuit is completed through contact 20, conductor 21, winding $S_1$ of contactor D, conductor 22 and the bright filament of the headlight HL. The winding $S_1$ is, therefore, in series with the headlight filament and as long as the filament is not defective, this winding will be energized and will overcome the pull of the shunt winding $P_1$.

A circuit is also completed through conductor 23, winding $S_3$ of contactor E, conductor 37 and the bright filament of headlight HR. The energized winding $S_3$ functions in the same manner with respect to the headlight HR as just described. A circuit is also completed through conductor 24, the parallel branch circuits across the closed contacts 25 and 26 of contactors D and E, conductor 28 and indicator lamp $L_1$. The light from this lamp causes the projection of the upwardly pointing image 4 on the view plate of section A as above described, indicating that the headlights are operating brightly. As long as both of the headlights operate properly, this indication will be given. Suppose, however, that the bright filament of headlight HL should burn out, this would interrupt the circuit of winding $S_1$ of contactor D and would allow the energized shunt winding $P_1$ to pull the armature of the contactor upward, thereby opening the circuit across contacts 25 and completing the circuit of lamp $L_4$ as follows: through switch SW, conductor 14, conductor 18 across closed contacts 17 of contactor D, conductor 19, and lamp $L_4$. This would cause the projection of the image 7 upon the view plate of section B, indicating that the left hand headlight had ceased to function.

Should the bright filament of headlight HR fail, the winding $S_3$ of contactor E would be de-energized and the shunt winding $P_3$ would pull the armature upward. This would open the circuit across contacts 26 and complete the circuit of lamp $L_3$ as follows: through contacts 12 and 13 of switch SW, conductor 39, conductor 40, across closed contacts 41 of contactor E, the conductor 43, and lamp $L_3$. This would cause the formation of image 6 which points toward the right and indicates failure of the right hand headlight.

If the switch SW is through to the right, the circuits of the dim filaments of the two headlights will be completed through the series coils $S_2$ and $S_4$ of contactors D and E, which circuits may be readily traced from the above description. At the same time, the shunt windings $P_1$, $P_3$ and $P_5$ will be energized by virtue of the connection between contacts 12 and 13 of switch SW. The lamp $L_2$ will now be energized by the circuit including contacts 13 and 29 of switch SW, conductor 30, conductor 32, conductor 33, the parallel branch circuits across closed contacts 34 and 35 of the contactor D and E, conductor 37, and lamp $L_2$. This will cause the formation of the downwardly pointing image 5 on the view plate of section A, indicating dim operation of the headlights. Should either of the dim filaments of the headlights fail, the corresponding series coil $S_2$ or $S_4$ will be de-energized, allowing the contactor to operate and cause operation of either of the lamps $L_3$ or $L_4$ in the manner above described.

If both headlights should fail, then contactors D and E would function at the same time, opening the circuit at 25, 26, or 34, 35, depending upon whether the headlights are on bright or dim, thus extinguishing the lamp $L_1$ or $L_2$. At the same time, contacts 17 and 41 would be closed, simultaneously lighting the lamps $L_3$ and $L_4$, which form a star-shaped image upon indicator B. The object of the two lower contact discs with their corresponding fixed contacts on the contactors D and E is to extinguish the lamp $L_1$ or $L_2$ in case both headlights should fail, which together with the star-shaped image upon indicator B, gives a positive indication. When only one contactor functions, there is still a circuit for lamp $L_1$ or $L_2$ across the closed contacts of the other contactor, but when both contactors function at the same time, the signalling circuit is naturally opened, extinguishing the lamp $L_1$ or $L_2$ according to whether the headlights are on bright or dim. This arrangement is very desirable but not absolutely necessary, as without it the device would still give a complete indication of lamp failures, the only difference being that in case of a failure of both headlights, the image on indicator A would not be extinguished. So if necessary, for reasons of economy, these contacts could be eliminated, then all the electromagnetic contactors would function with only one contactor disc H.

In either position of switch SW, the tail light T will be energized through the circuit including conductor 39, series winding $S_5$ of contactor F, conductor 45, and the tail light T. This will serve to maintain the contacts of contactor F open until such time as the tail light should fail, when the shunt winding $P_5$ will then be enabled to pull the armature upward and close the contacts, completing a circuit through conductor 39 across the contacts 42, conductor 44 and lamp $L_6$. This will cause the formation of the image 9 on the view plate of section C, thereby indicating failure of the tail light.

Independently of the switch SW, the stop light is energized whenever the brake-operated switch 11 is closed through the circuit including conductor 46, series winding $S_6$ of contactor G, conductor 48, and the stop light ST. At the same time, the shunt winding $P_6$ of the contactor will be energized in an obvious manner. The contactor will not be actuated due to the electromagnetic pull of the series winding. Should the stop light fail, then the shunt winding will be enabled to raise the armature, closing contacts 47 and completing a circuit through conductor 49 and lamp $L_5$. This will cause the formation of the image 8 on the view plate of section C, indicating failure of the stop light.

By disregarding the prior use of springs as a necessary part of the device to actuate the signal contacts, and in place of them using shunt magnets, I have been able to design an electromagnetic contactor with two independent circuits, having two unequal forces pulling in opposite directions. The series magnet being at the bottom and always the stronger of the two forces, the moving armature is always held in this position as long as there is current flowing in the series coil. If a filament should fail, the circuit through the series coil would naturally be broken, demagnetizing the lower magnet and allowing the shunt magnet to pull the armature up, thereby closing the proper signalling circuits, and under certain conditions the opening of others.

My arrangement of the indicator assembly is both novel and practical, and with it I have been able to give a complete and accurate indication of all the principal lights in the lighting system, without using a multitude of complicated and unnecessary parts. The three indicators A, B, C perform eight distinct functions; namely, A indicates if the headlights are on bright or dim; B indicates a failure of one or both headlights, and functions whether the lights be on bright or dim; C indicates a failure of one or both tail lights, and one or both stop lights.

It will be obvious that the device may be readily adapted to give audible indications either along or in addition to the visible indications. For example, by including electrically operable audible signal devices, such as bells or buzzers, in the circuits of the lamps $L_3$ to $L_6$, an audible indication will be given whenever a defective condition exists. If desired, the audible signal devices could be arranged to give different tones or sound intensities for different conditions. Also, the audible signal devices could be used in place of the lamps $L_3$ to $L_6$. Other arrangements will occur to those skilled in the art.

It will be seen that the device is designed to indicate every possible failure of the principal lamps of the lighting system and that it is relatively simple when viewed in the light of the functions that it performs. Moreover, its design is such that it has many advantages and desirable features. Although the device is preferably constructed substantially as hereindisclosed, it will be apparent that various changes and modifications may be made without departing from the spirit and scope of the invention.

I claim:

1. In a system for indicating the condition of a plurality of multi-element electrical devices, energizing circuits for the elements of said devices, means for energizing certain elements of said devices or for energizing other elements of said devices at will, a pair of electrically-operated indicators for indicating respectively the energization of the different elements of said devices, energizing circuits for said indicators, a second pair of indicators for indicating respectively the failure of said devices, energizing circuits for said last-mentioned indicators, a plurality of electromagnetic switching devices, one for each of said first-mentioned devices, each switching device comprising an electromagnet having a plurality of windings acting in the same direction and each serially connected with an element of one of the first-mentioned devices, a second electromagnet arranged to act in opposition to said first electromagnet and connected in shunt relation with said windings and associated elements, an armature controlled by said electromagnets, the electromagnets being constructed and arranged so that the force exerted by said first electromagnet is sufficient to maintain said armature in one position against the force exerted by said second electromagnet, said armature being actuated to another position by said second electromagnet whenever the energized circuit through one of said windings is interrupted, whereby said armature is positively and firmly maintained in one or the other position by the action of said electromagnets, plural pairs of normally closed switch contacts on each of said switching devices, the corresponding pairs of contacts of the respective switching devices being connected in multiple with the respective indicators of said first-mentioned pair of indicators and arranged to maintain the energizing circuits of said first-mentioned indicators whenever only one said switching devices are actuated from normal position and to interrupt the energizing circuits of said first-mentioned indicators whenever both of said switching devices are actuated from normal position, and normally open switch contacts on each of said switching devices and arranged to control the respective energizing circuits of said last-mentioned indicators.

2. In an apparatus for indicating the failure of a lamp on a vehicle such as an automobile, an energizing circuit for said lamp, an electromagnet having a movable core and serially connected with said lamp in said energizing circuit, an electrically operable indicator, an energizing circuit for said indicator connected in shunt relation with the series connected lamp and electromagnet, normally open switch contacts in said indicator energizing circuit for controlling the same, an armature carried by said movable core for controlling said contacts and gravity-biased to open circuit position, said electromagnet serving to magnetically hold said armature positively in open circuit position when the lamp is energized, a second electromagnet having a movable core connected to the opposite side of said armature and arranged to act in opposition to said first electromagnet, said second electromagnet being connected in shunt relation with the series-connected lamp and first electromagnet, said second electromagnet being incapable of moving said armature against the force of gravity and the magnetic forces of said first electromagnet but arranged to actuate the armature to switch closing position whenever said first electromagnet is de-energized due to failure of said lamp, thereby to close said indicator energizing circuit to give an indication of the failure of said lamp.

GEORGE W. HIPSLEY.